United States Patent
Kozul et al.

(10) Patent No.: US 11,687,625 B2
(45) Date of Patent: Jun. 27, 2023

(54) SYSTEMS AND METHODS FOR SOFTWARE LICENSE MANAGEMENT USING A DISTRIBUTED LEDGER

(71) Applicant: JPMORGAN CHASE BANK, N.A., New York, NY (US)

(72) Inventors: Adam K. Kozul, Columbus, OH (US); Michael J. Vaughan, Scituate, MA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/656,561

(22) Filed: Mar. 25, 2022

(65) Prior Publication Data

US 2022/0215073 A1    Jul. 7, 2022

Related U.S. Application Data

(62) Division of application No. 16/544,420, filed on Aug. 19, 2019, now Pat. No. 11,288,343.

(51) Int. Cl.
    G06F 21/10      (2013.01)
    H04L 9/06       (2006.01)
    H04L 9/00       (2022.01)

(52) U.S. Cl.
    CPC .......... G06F 21/105 (2013.01); H04L 9/0637 (2013.01); H04L 9/50 (2022.05)

(58) Field of Classification Search
    CPC ........ G06F 21/105; H04L 9/0637; H04L 9/50
    USPC .......................................................... 726/26
    See application file for complete search history.

(56) References Cited

U.S. PATENT DOCUMENTS

| 10,373,158 B1* | 8/2019 | James | G06Q 40/04 |
| 2002/0128976 A1* | 9/2002 | O'Connor | G06Q 20/367 |
| | | | 705/65 |
| 2018/0052713 A1* | 2/2018 | Marnell | G06F 9/5027 |

(Continued)

FOREIGN PATENT DOCUMENTS

EP         3396575        10/2018

OTHER PUBLICATIONS

International Search Report, dated Oct. 8, 2020, from corresponding International Application No. PCT/US2020/047033.

(Continued)

*Primary Examiner* — Michael S McNally
(74) *Attorney, Agent, or Firm* — Greenberg Traurig LLP

(57) ABSTRACT

Systems and methods for software license management using a distributed ledger are disclosed. A method for software license management may include: receiving, from an agent executed by an electronic device in a computer network, a request for a new software license for the electronic device or for a user; determining that there are no available tokens for associated with the software license in a license inventory; obtaining a license for the software; generating a token for the license, wherein the token comprises an identification of a license type and a software identifier; writing the token to a license distributed ledger with an indication that the token is available; reserving the token for the electronic device or the user and writing the reservation to the license distributed ledger; and adding a second token for the license to an electronic wallet associated with the electronic device or the user.

12 Claims, 4 Drawing Sheets

(56) References Cited

U.S. PATENT DOCUMENTS

2018/0314809 A1* 11/2018 Mintz .................. H04L 9/3297

OTHER PUBLICATIONS

Written Opinion of the International Searching Authority, dated Oct. 8, 2020, from corresponding International Application No. PCT/US2020/047033.
Herbert, Jeff; et al., A Novel Method for Decentralised Peer-to-Peer Software License Validation Using Cryptocurrency Blockchain Technology, Proceedings of the 38th Australasian Computer Science Conference, Jan. 30, 2015; pp. 27-35.

* cited by examiner

SYSTEMS AND METHODS FOR SOFTWARE LICENSE MANAGEMENT USING A DISTRIBUTED LEDGER

RELATED APPLICATIONS

This application is a divisional of U.S. patent application Ser. No. 16/544,420, filed Aug. 19, 2019, now U.S. Pat. No. 11,288,343, the disclosure of which is hereby incorporated, by reference, in its entirety.

BACKGROUND OF THE INVENTION

1. Field of the Invention

The present disclosure generally relates to systems and methods for software license management using a distributed ledger.

2. Description of the Related Art

In general, license validation is not performed or is performed on a limited basis during the purchase and deployment of licensed software. Obtaining accurate software compliance reporting is extremely difficult and labor intensive. This leads to an over dependence on ELA and may expose an organization to an increased risk of software licensing audits.

SUMMARY OF THE INVENTION

Systems and methods for software license management using a distributed ledger are disclosed. In one embodiment, in an information processing apparatus comprising at least one computer processor, a method for software license management may include: (1) receiving, from an agent executed by an electronic device in a computer network, a request for a new software license for the electronic device or for a user; (2) determining that there are no available tokens for associated with the software license in a license inventory; (3) obtaining a license for the software; (4) generating a token for the license, wherein the token comprises an identification of a license type and a software identifier; (5) writing the token to a license distributed ledger with an indication that the token is available; (6) reserving the token for the electronic device or the user and writing the reservation to the license distributed ledger; and (7) adding a second token for the license to an electronic wallet associated with the electronic device or the user.

In one embodiment, the step of obtaining a license for the software may include automatically purchasing the license from a vendor.

In one embodiment, the identification of the license type may include at least one of a personal license or a device license.

In one embodiment, the token may also include an identifier of at least one of a publisher of the software, a version number of the software, a purchase order associated with the license, and at least one maintenance date for the license.

In one embodiment, the electronic wallet associated with the electronic device or the user may be maintained by a second distributed ledger.

In one embodiment, the license inventory may be maintained by the license distributed ledger.

In one embodiment, the second token may include a copy of the token.

In one embodiment, the method may further include receiving a request to remove the license for the electronic device or the user; removing the second token from the wallet associated with the electronic device or the user; and writing that the token is available on the license distributed ledger.

In one embodiment, the step of removing the second token from the wallet associated with the electronic device or the user may include writing the removal of the second token from the wallet associated with the electronic device or the user to a second distributed ledger.

According to another embodiment, in an electronic device comprising at least one computer processor a method for software license management may include a software agent executed by the computer processor performing the following: (1) detecting an initiation of a computer program that requires a license for the electronic device or for a user of the electronic device; (2) interrupting the initiation of the computer program; (3) accessing a wallet associated with the electronic device or the user of the electronic device for a token associated with the computer program; (4) verifying that the token associated with the computer program is in the wallet; and (5) resuming initiation of the computer program.

In one embodiment, the step of verifying that the token associated with the computer program is in the wallet may include verifying that the token associated with the computer program is valid.

In one embodiment, the wallet may be maintained by the electronic device, a distributed ledger, combinations thereof, etc.

According to another embodiment, a system for software license management may include a computer network having a server executing a software license management program; a plurality of electronic devices, each electronic device executing an agent computer program; and a license distributed ledger that maintains a license inventory. The software license management program may receive, from one of the agents, a request for a new software license for the electronic device that is executing the agent or for a user of the electronic device; the software license management program may determine that there are no available tokens for associated with the software license in the license inventory; the software license management program may obtain a license for the software; the software license management program may generate a token for the license, wherein the token comprises an identification of a license type and a software identifier; the software license management program may write the token to the license distributed ledger with an indication that the token is available; the software license management program may reserve the token for the electronic device or the user and writing the reservation to the license distributed ledger; and the software license management program adds a second token for the license to an electronic wallet associated with the electronic device or the user.

In one embodiment, the identification of the license type may be a personal license and/or a device license.

In one embodiment, the token further may also include an identifier of at least one of a publisher of the software, a version number of the software, a purchase order associated with the license, and at least one maintenance date for the license.

In one embodiment, the system may further include a second distributed ledger, and the electronic wallet associated with the electronic device or the user is maintained by the second distributed ledger.

In one embodiment, the software license management program may receive a request to remove the license for the electronic device or the user; the software license management program may remove the second token from the wallet associated with the electronic device or the user; and the software license management program may write that the token is available on the license distributed ledger. The software license management program may remove the second token from the wallet associated with the electronic device or the user by writing the removal of the second token from the wallet associated with the electronic device or the user to the second distributed ledger.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Systems and methods for software license validation using a distributed ledger are disclosed.

Embodiments may replace existing license tracking in a centralized system with a distributed ledger system, such as a Blockchain-based system, with perpetual license verification checks at the request and launch of the application. Thus, license management moves from a series of collected data points to a virtual immutable token.

In one embodiment, a primary distributed ledger, such as a Blockchain-based distributed ledger, may be used to manage an organization's software licenses. For example, each license in an organization may be converted to a token in a token the distributed ledger. As new licenses are purchased, a new token may be generated (e.g., mined). As software is assigned to users or machines, the primary distributed ledger may transfer the token to a "side chain" that may be specific to the user or machine.

During software launch, a check may be made to confirm that the user and/or machine has the token corresponding to that software in their wallet.

Embodiments provide complete and immutable tracking of licenses from purchase to end point, including reassignment of transfers. Embodiments may prevent uses from launching licensed software that they do not have a corresponding license for.

Figure 1:
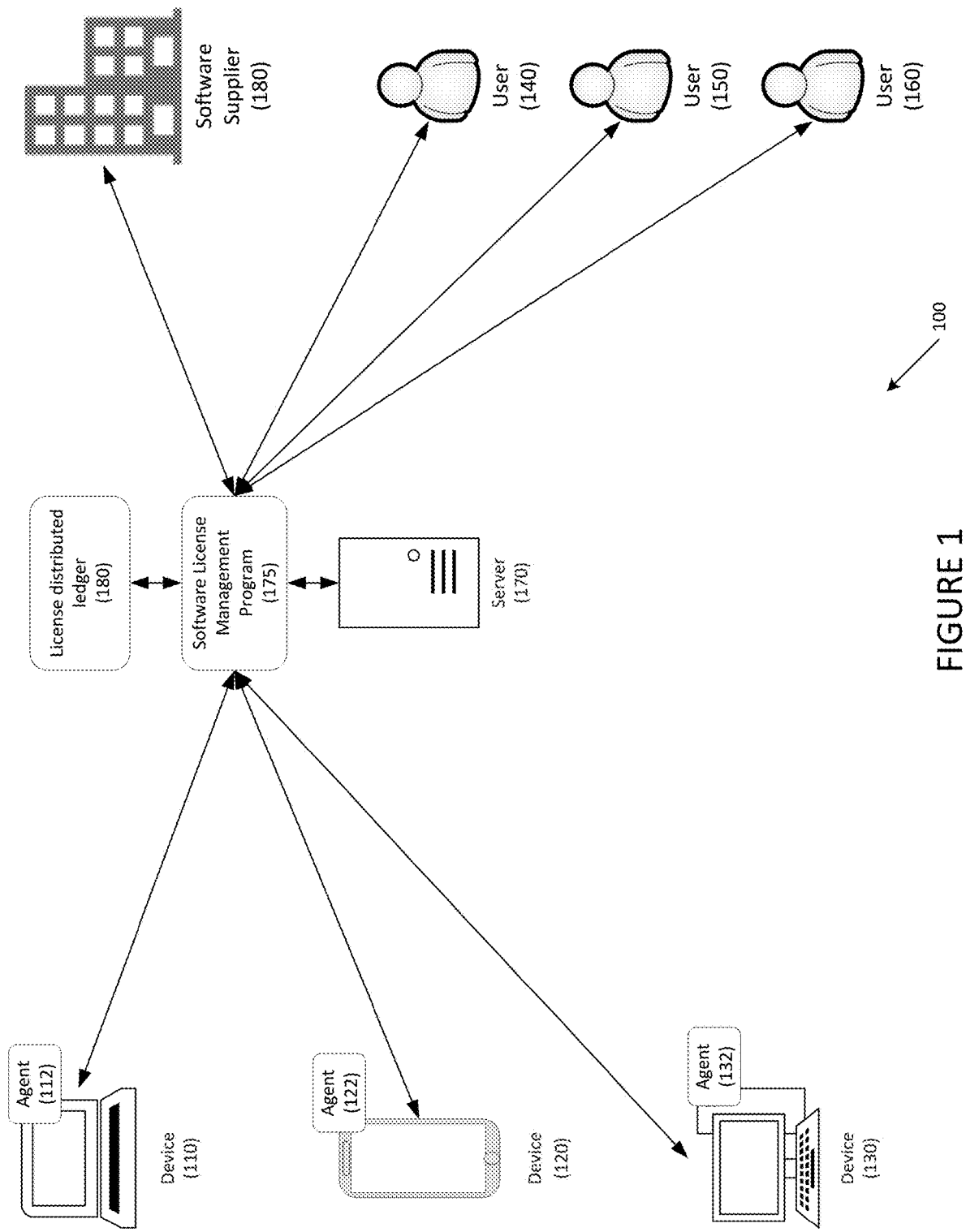
FIG. 1 discloses a system for software license management using a distributed ledger according to one embodiment.

Referring to FIG. 1, a system for software license validation using a distributed ledger is disclosed according to one embodiment. System 100 may include electronic devices 110, 120, 130, which may be accessed by a user. Electronic devices 110, 120, 130 may be any suitable electronic device, including workstations, desktop computers, notebook computers, laptop computers, smartphones, smart watches, Internet of Things (IoT) devices, etc. In general, any electronic device that may execute software requiring a license may be used.

Although only three electronic devices 110, 120, 130 are depicted in FIG. 1, it should be recognized that a greater or fewer number of electronic devices may be in system 100.

Each electronic device 110, 120, 130 may be associated with a wallet (not shown). In one embodiment, each wallet may be maintained in any suitable location where agent 112, 122, 132 may look for it, such as server 170, by the respective electronic device 110, 120, 130, in a second distributed ledger, in the cloud, combinations thereof, etc.

Each electronic device may execute agent or program 112, 122, 132 that may check on a status of software that requires a license when the software is launched. Agent or program 112, 122, 132 may intercept the launch of a program that requires a license and may perform a license check before allowing the launch to complete.

In one embodiment, agent or program 112, 122, 132 may be integrated into the operating system.

System 100 may further include a plurality of users 140, 150, 160, and each user 140, 150, 140. Again, although only users 140, 150, 160 are depicted in FIG. 1, it should be recognized that a greater or fewer number of users may be in system 100.

In one embodiment, users 140, 150, 160 may be employees, agents, contractors, etc. of an organization.

Each user 140, 150, 160 may be associated with a wallet (not shown). For example, a copy of the wallet may be maintained at the server level (e.g., on the server, in the cloud, in a distributed file share, etc.), and another at the user level, such as on the electronic device.

System 100 may further include server 170, which may execute software license management program 175. In one embodiment, software license management program 175 may manage an organization's licenses, including generating tokens to represent licenses, reserving tokens when licenses are issued, releasing tokens when licenses are surrendered, requesting additional licenses from a software provider when additional licenses are needed, returning extra licenses to the software provider when they are no longer needed, etc.

In one embodiment, software license management program 175 may be used to fulfill audit requirements from vendors by providing an immutable source of compliance. By aligning the tokens to the licenses purchased and ensuring compliance using agents 112, 122, 132, unauthorized installs of software may be prevented.

In one embodiment, software license management program 175 may be one or more smart contract.

Software license management program 175 may interface with electronic devices 110, 120, 130.

In one embodiment, license distributed ledger 180 may be provided. License distributed ledger may be maintained by server 170 and distributed locally (e.g., stored with the respective user 140, 150, 160 and/or electronic device 110, 120, 130).

Figure 2:
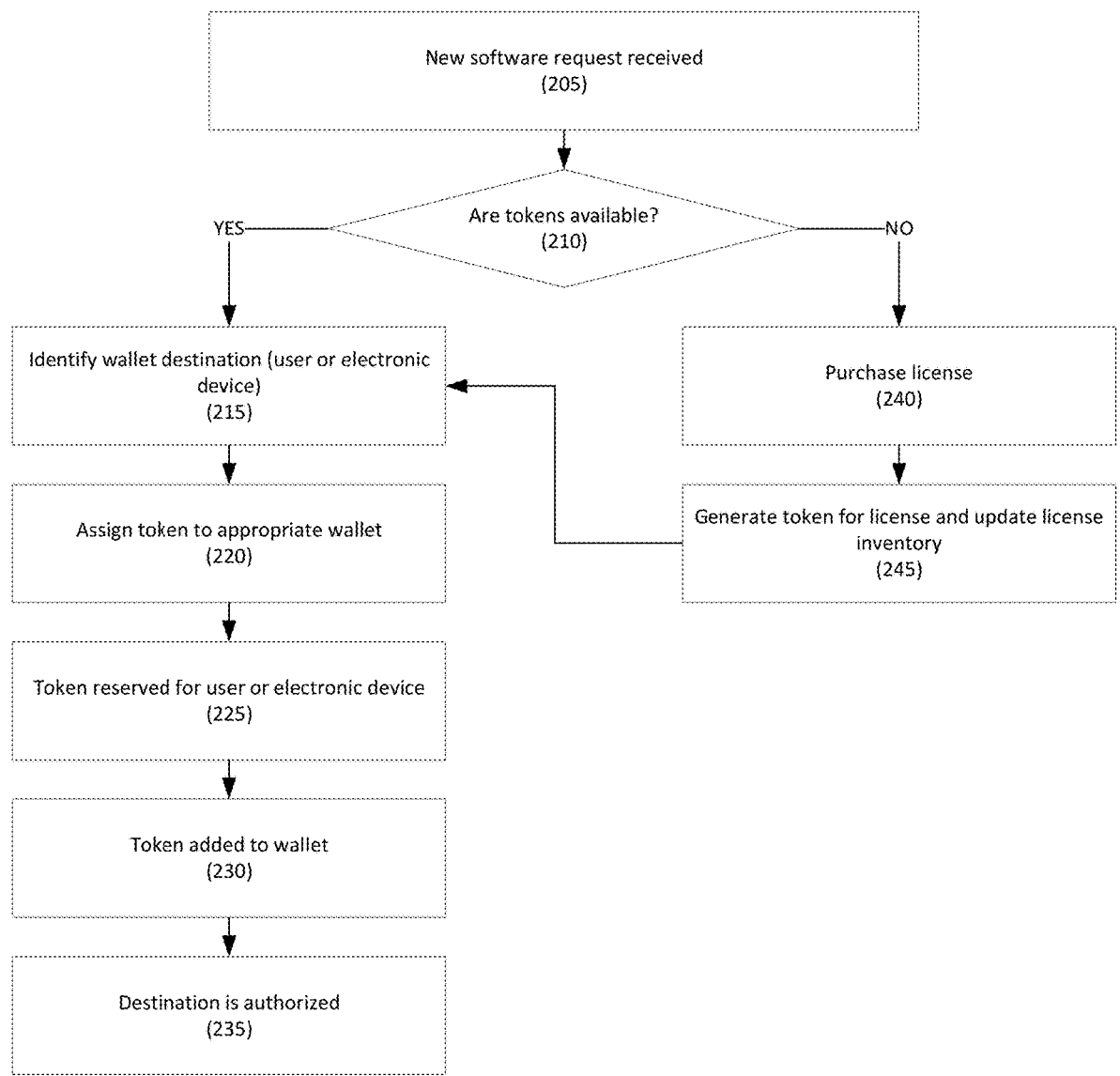
FIG. 2 discloses a method for software license management using a distributed ledger for a new software request according to one embodiment.

Referring to FIG. 2, a method for software license management using a distributed ledger is disclosed for a new software license request according to one embodiment.

In step 205, a new software license request may be received. In one embodiment, the new software license request may be received from or for a user when new software is deployed to a user's electronic device.

In step 210, a check may be made to see if any tokens representing a purchased license to the software are available. In one embodiment, this check may be performed by a centralized software license management program.

In step 215, if there are tokens available, the destination for the token may be identified. For example, the license may be specific to an electronic device, or it may be specific to a user. In one embodiment, the destination may be specified in the license request. In another embodiment, the destination may be determined by the software license management program.

In one embodiment, the license type may be a field embedded in the token during creation. This would be determined by the vendor purchase/contract.

In step 220, a token may be assigned to the appropriate wallet for the destination. For example, if the destination is an electronic device, the token may be assigned to a wallet associated with the electronic device. If the destination is a user, the token may be assigned to a wallet for the user.

In step 225, the token may be reserved for the destination. For example, the software license management program may mark the token as no longer available, and the token reservation may be written to a license distributed ledger. In one embodiment, the token reservation may be written with an identification of the destination, the date/time of reservation, etc.

In step 230, the token may be added to the destination's wallet. In one embodiment, the wallet may exist on a second distributed ledger, and the token may be written to the second distributed ledger with a wallet identifier.

For example, a new token may be mined for the wallet. The new token may be a copy of the token from the license distributed ledger with the exception that may not keep the "ID" of the token on the license distributed ledger. The wallet, or second distributed ledger, may be specific to the user or device, and may contain all the tokens spun off the license distributed ledger and assigned to that end point.

In step 235, the destination is authorized to use the software.

If, in step 210, a token is not available, in step 240, a license may be purchased from the software provider or similar entity. In one embodiment, the software license management program may perform this transaction automatically.

In step 240, once the transaction is complete, the software license management program may generate a token for the license and may add it to the license inventory. In one embodiment, the software license management program may write the token to a distributed ledger and indicate that the token is available.

The token may maintain the license type, the product, publisher, and/or version information, the purchase order, maintenance dates, etc.

Once the token is available, the user may be informed that the license is available for use, and the process may continue with step 215, above.

Figure 3:
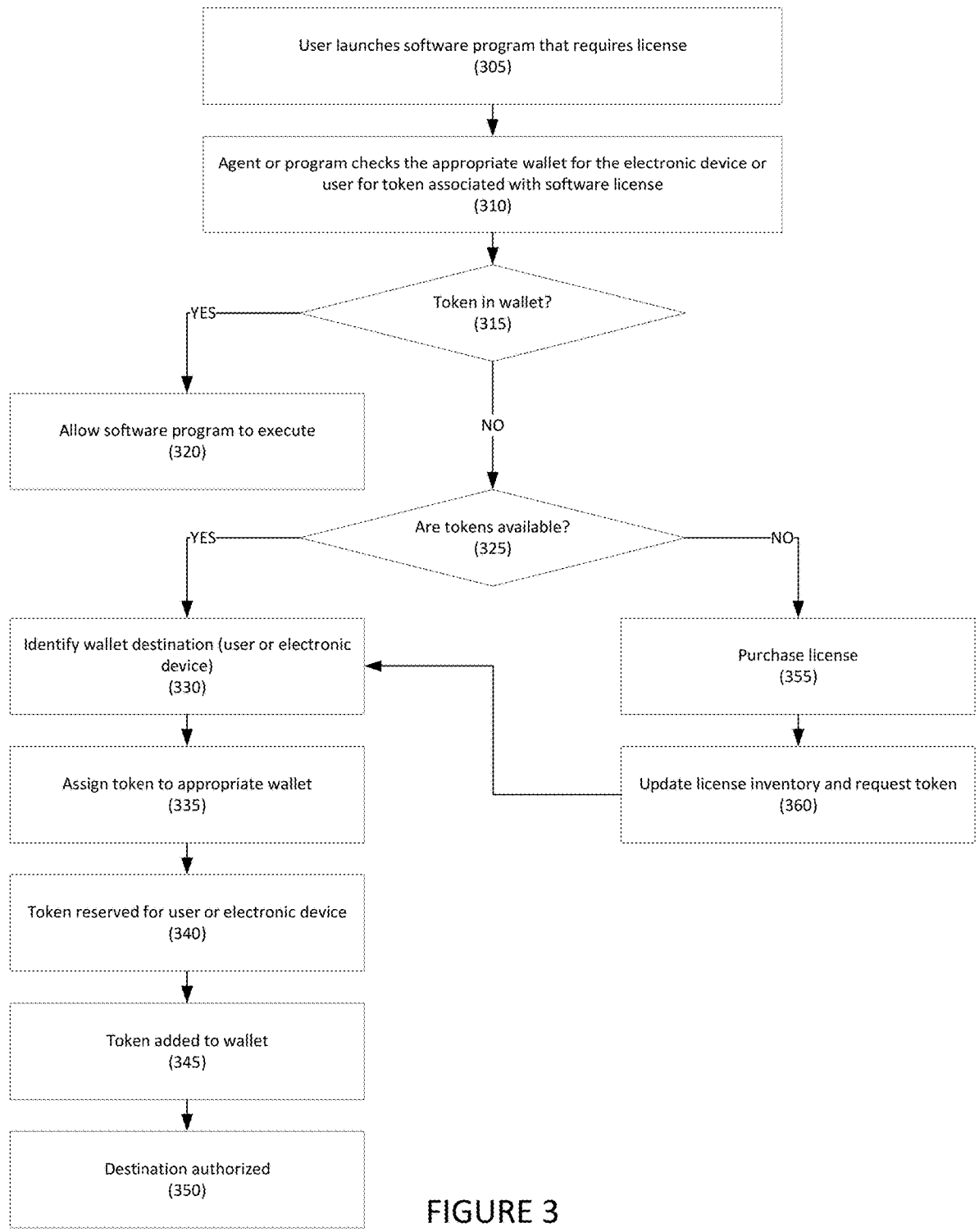
FIG. 3 discloses a method for software license validation using a distributed ledger according to another embodiment.

Referring to FIG. 3, a method for software license validation using a distributed ledger is disclosed according to one embodiment.

In step 305, a user may launch a software program that requires a license. In one embodiment, the user may launch the software program on any suitable electronic device.

In step 310, an agent or software program executed on the electronic device may check an appropriate wallet to verify that the electronic device and/or the user has a license to use the software. In one embodiment, the agent or program may determine the appropriate licensee for the software (e.g., based on the license type in the token) and may access the appropriate wallet to determine if the wallet includes a token representing a license to the software.

In step 315, if a token is present, in step 320, the software program may continue to launch as usual.

If a token is not present, in step 325, a check may be made to see if tokens are available. This may be similar to step 210, above.

In step 330, if there are tokens available, the destination for the token may be identified. This may be similar to step 215, above.

In step 335, a token may be assigned to the appropriate wallet for the destination. This may be similar to step 220, above.

In step 340, the token may be reserved for the destination. This may be similar to step 225, above. For example, the software license management program may mark the token as no longer available, and the token reservation may be written to a license distributed ledger.

In step 345, the token may be added to the destination's wallet. This may be similar to step 230, above.

In step 350, the destination is authorized to use the software. This may be similar to step 235, above.

If, in step 325, a token is not available, in step 355, a license may be purchased from the software provider or similar entity. This may be similar to step 240, above.

In step 360, once the transaction is complete, the software license management program may generate a token for the license and may add it to the license inventory. This may be similar to step 245, above.

Once the token is available, the user may be informed that the license is available for use, and the process may continue with step 330, above.

Figure 4:
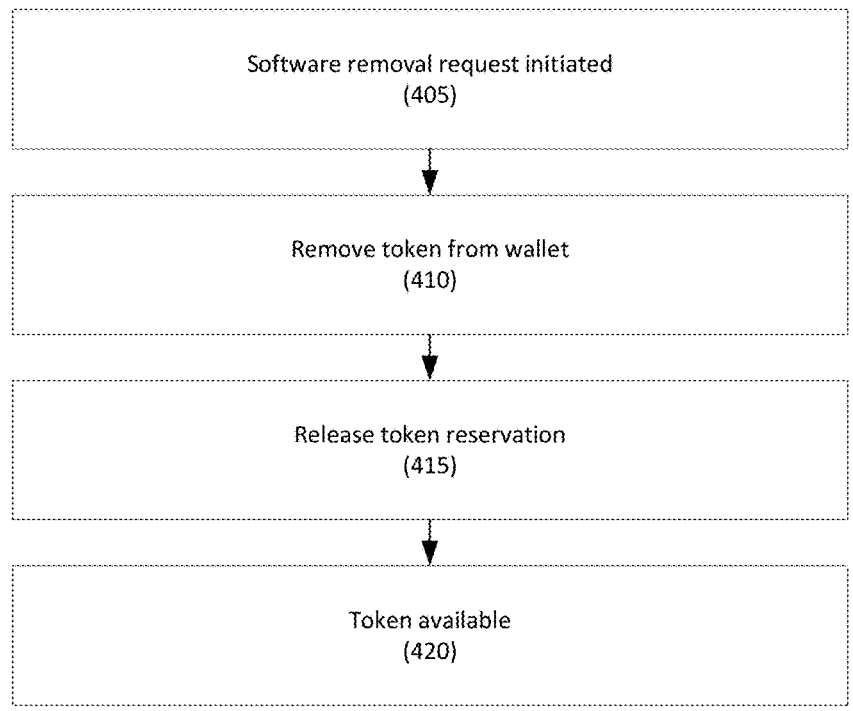
FIG. 4 discloses a method for software license surrender using a distributed ledger according to one embodiment.

Referring to FIG. 4, a method for software license surrender using a distributed ledger is disclosed according to one embodiment.

In step 405, a software removal request may be received. In one embodiment, the software removal request may be received from a user, from an organization, from any automated process that may be allowed to interact with the process, etc.

In one embodiment, an agent or program executed on an electronic device may automatically generate a software removal request in response to software that requires a license being removed from the electronic device.

In step 410, a software license management program may remove a token representing that license from a wallet associated with the electronic device or the user. Once the token is removed, the software may no longer be available to use or to launch.

In one embodiment, the software license management program may write the removal of the token to the appropriate wallet. For example, the wallet may be maintained on a distributed ledger.

In step 415, the software license management program may release a reservation on the token from the token inventory, thereby making the token available to other users or electronic devices as appropriate.

In one embodiment, the software license management program may write the availability of the token to a distributed ledger. In one embodiment, the date/time of the release, etc. may be written as is necessary and/or desired.

In step 420, the token may be made available as part of the token inventory.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for software license management, comprising:
   in an electronic device comprising at least one computer processor, a software agent executed by the computer processor performing the following:
   detecting an initiation of a computer program on the electronic device that requires a license for the electronic device or for a user of the electronic device;
   interrupting the initiation of the computer program;
   accessing a wallet associated with the electronic device or the user of the electronic device;
   verifying, based on the accessing, that a license token associated with the computer program is not in the wallet;
   sending, to a license management program, a request for the license token;
   receiving, at the wallet associated with the electronic device or the user of the electronic device, the license token, wherein the license token is based on a second license token that is written to a license distributed ledger; and
   prompting resumption of the initiation of the computer program based on the receiving the license token.

2. The method of claim 1, comprising:
   verifying that the received license token is valid.

3. The method of claim 1, wherein the wallet is maintained by the electronic device.

4. The method of claim 1, wherein the wallet is maintained in a distributed ledger.

5. An electronic device including a processor, wherein the processor is configured to:
   detect an initiation of a computer program on the electronic device that requires a license for the electronic device or for a user of the electronic device;
   interrupt the initiation of the computer program;
   access a wallet associated with the electronic device or the user of the electronic device;
   verifying, based on the access, that a license token associated with the computer program is not in the wallet;
   send, to a license management program, a request for the license token;
   receive, at the wallet associated with the electronic device or the user of the electronic device, the license token, wherein the license token is based on a second license token that is written to a license distributed ledger; and prompt resumption of the initiation of the computer program based on the received license token.

6. The electronic device of claim 5, wherein the processor is further configured to verify that the received license token is valid.

7. The electronic device of claim 5, wherein the wallet is maintained by the electronic device.

8. The electronic device of claim 5, wherein the wallet is maintained in a distributed ledger.

9. A non-transitory electronic device readable storage medium, including instructions stored thereon for software license management, which when read and executed by an electronic device cause the electronic device to perform steps comprising:

detecting an initiation of a computer program on the electronic device that requires a license for the electronic device or for a user of the electronic device;

interrupting the initiation of the computer program;

accessing a wallet associated with the electronic device or the user of the electronic device;

verifying, based on the accessing, that a license token associated with the computer program is not in the wallet;

sending, to a license management program, a request for the license token;

receiving, at the wallet associated with the electronic device or the user of the electronic device, the license token, wherein the license token is based on a second license token that is written to a license distributed ledger; and prompting resumption of the initiation of the computer program based on the receiving the license token.

10. The non-transitory electronic device readable storage medium of claim 9, comprising:

verifying that the receive license token is valid.

11. The non-transitory electronic device readable storage medium of claim 9, wherein the wallet is maintained by the electronic device.

12. The non-transitory electronic device readable storage medium of claim 9, wherein the wallet is maintained in a distributed ledger.

* * * * *